April 8, 1941.   W. S. BRUBAKER ET AL   2,237,520
LIQUID FLOW-THROTTLING AND AIR-ELIMINATING MEANS
Filed Oct. 14, 1938   2 Sheets-Sheet 1

Inventors
Walter S. Brubaker
Armas J. Saarinen

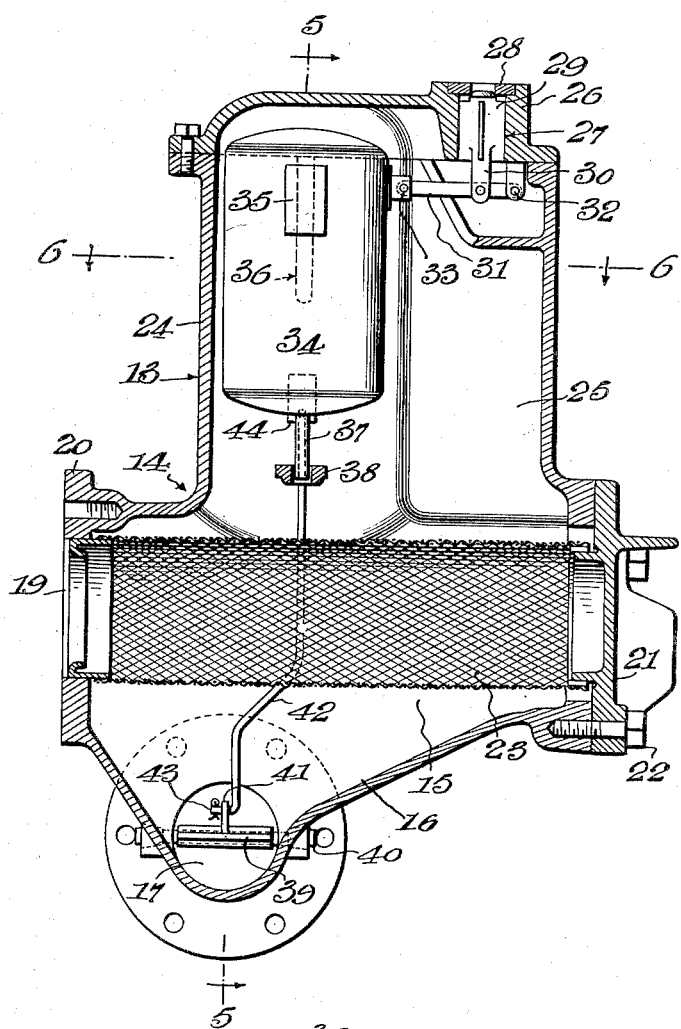
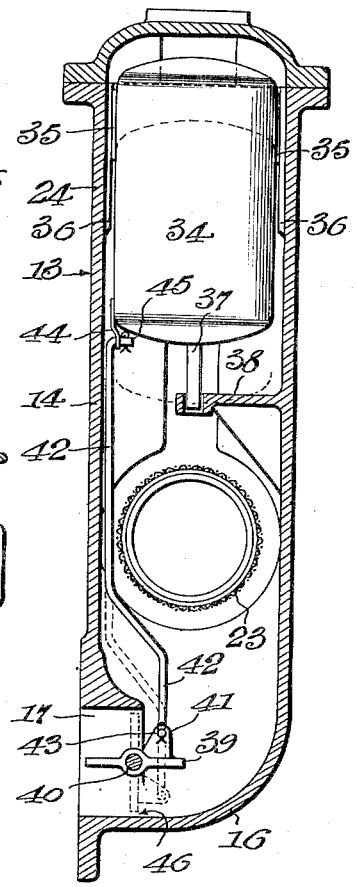
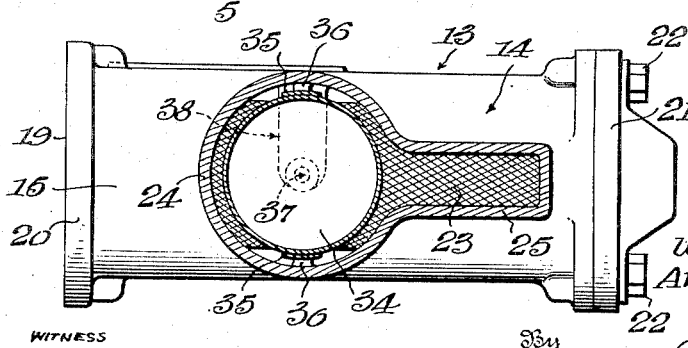

Patented Apr. 8, 1941

2,237,520

UNITED STATES PATENT OFFICE 2,237,520

LIQUID FLOW-THROTTLING AND AIR-ELIMINATING MEANS

Walter S. Brubaker, Oakland, and Armas J. Saarinen, San Francisco, Calif., assignors, by mesne assignments, to S. F. Bowser & Company, Incorporated, Fort Wayne, Ind., a corporation of Indiana Application October 14, 1938, Serial No. 235,088

7 Claims. (Cl. 73—200)

The problem of eliminating air from liquid-handling and/or measuring systems, for instance, to prevent such air from causing faulty meter operation, has received considerable attention. For systems having relatively low rates of flow, the problem has been more or less successfully solved by the use of float-actuated air eliminators, but such eliminators fail to meet the present day requirements, particularly on oil and gasoline trucks, such requirements being (1) higher speeds of liquid delivery, (2) lighter and more compact equipment, and (3) restricted volumetric capacity of equipment. If such eliminators be constructed sufficiently small to meet requirements (2) and (3) and yet permit such rapid flow as to meet requirement (1), they possess insufficient air eliminating capacity to effectively eliminate the air which enters the eliminator with the rapidly flowing liquid when flow starts from any tank or compartment, and the air which enters the eliminator with the liquid when the tank or compartment is almost empty.

The ideal solution of the problem—automatic elimination of all air from the liquid stream with a small, light and compact structure, while discharge is taking place at a speed meeting present day requirements—so far has not been achieved and it seems that effective air elimination with such a small, light and compact structure, can be attained only if the liquid stream be flowing at a relatively slow speed. Our invention makes novel provision for attaining such a relatively slow liquid speed only during relatively short periods when air elimination in comparatively large quantity is essential, and for permitting a normal much faster flow meeting requirements for rapid delivery, throughout the major part of any delivery operation. The periods requiring air elimination in relatively large quantity are (1) when flow from a tank or compartment is started through the system and carries any air which may have previously entered, into the air eliminator, and (2) when the tank or compartment is about empty and the liquid turbulence at the tank or compartment outlet causes air to be entrained with the liquid and carried thereby into said air eliminator. Only during these relatively short periods, is the rate of discharge throttled, and the required rapid discharge takes place throughout the major portion of the delivery operation. We are thus enabled, with a small, light and compact structure, to approach the ideal as closely as now seems humanly possible.

We are aware that air eliminators have heretofore been provided having a valve for entirely stopping the liquid flow when a relatively large quantity of air exists in the eliminator air chamber, and for again starting the flow when most of this air has been vented, but such eliminators are prone to repeatedly stop and start the flow when the tank or compartment is about empty, resulting in alternate stopping and starting of the meter and making it difficult for the attendant to determine when complete emptying has taken place, unless he patiently waits until he is sure the meter has come to a final stop. The valve of our invention which throttles the rate of flow when required, never stops the flow but merely restricts the rate of discharge sufficiently to permit air elimination. Whereas the normal flow may be, say from sixty to seventy g. p. m., restrictions of said flow to approximately twenty g. p. m. will insure effective air elimination, and from the above, it will be clear that this restricted flow occurs only during relatively short periods—at the beginning of flow from a tank or compartment, and when said tank or compartment is about empty.

Rather recently, it has become permissible to use one meter to serve a plurality of compartments of a tank truck, and provision is made either in the form of a selector valve or a hose connectable to the discharge faucet of any compartment, for conducting the liquid from any compartment to the meter. During the "change over" from one comartment to another, air enters the system and this air must of course be eliminated. This result is effectively accomplished by the use of our invention which is also advantageous in numerous other ways upon tank trucks.

Fig. 1 of the accompanying drawings is a top plan view illustrating the invention operatively connected with a meter.

Figs. 2 and 3 are side elevations looking in the directions indicated by the arrows 2 and 3 respectively, of Fig. 1.

Fig. 4 is an enlarged vertical sectional view on line 4—4 of Fig. 3.

Fig. 5 is a sectional view at right angles to Fig. 4 as indicated by line 5—5 thereof.

Fig. 6 is a horizontal sectional view on line 6—6 of Fig. 4.

Figure 1:
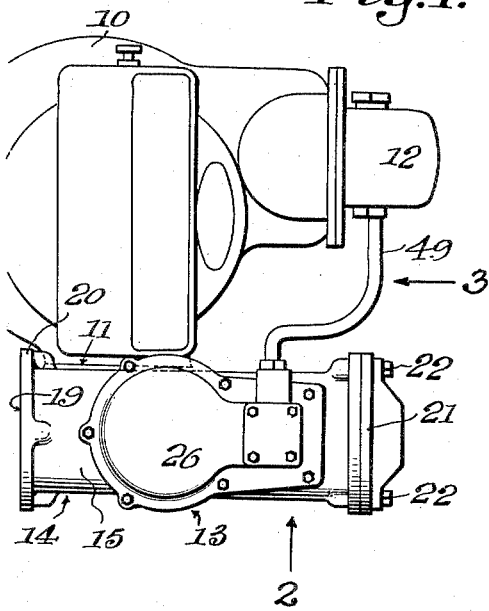

In Figs. 1, 2 and 3, 10 denotes a rotary type meter having a liquid inlet 11 and a discharge faucet 12. Operatively connected with the meter 10 to conduct the liquid to the inlet 11 thereof, for instance, from a tank or any compartment of a tank truck, is the novel flow throttling and air eliminating device 13, the preferred construction of which is illustrated in Figs. 4, 5 and 6, primarily.

The device 13 is provided with a casing 14 having a substantially cylindrical horizontal portion 15, the lower side of which is depressed as at 16, providing a hopper-like lower end for the casing, which end is formed with a liquid outlet 17, the axis of this outlet being horizontal in the present disclosure to permit direct communication of said outlet with the inlet 11 of the meter 10. The casing 14 is suitably flanged at 18 around the outer end of the outlet 17 to facilitate connection of said casing with the meter casing.

One end of the horizontal casing portion 15 is provided with a liquid inlet 19 and is flanged at 20 around said inlet for connection with any desired liquid conducting member, for example, the manifold of a selector valve for placing the casing 14 in communication with any compartment of the tank truck, or a hose for the same purpose. The opposite end of the casing portion 15 is provided with a closure 21 held removably in place by cap screws or the like 22. A suitable tubular strainer 23 extends from the liquid inlet 19 to the closure 21 and is held in place by this closure, and when the closure is removed, the strainer may be withdrawn for cleaning.

The casing 14 includes a substantially cylindrical portion 24 extending upwardly from the horizontal portion 15 toward one end of the latter, preferably toward the end having the inlet 19. This vertical casing portion 24 is provided with a narrow lateral extension 25 at the side thereof toward the closure 21. The extension 25 extends throughout the length of the portion 24 and communicates with said portion throughout its length, the lower end of said extension 25 being in communication with the horizontal casing portion 15 directly over the strainer 23. Due to the relation of the casing portion 24 and extension 25 with the horizontal casing portion 15 and the strainer 23, air liberated from the liquid entering said casing, may readily ascend into said portion 24 and the extension 25. The upper ends of these parts are closed by a suitable cap 26 having an air vent 27 at the upper end of the extension 25. A downwardly facing valve seat 28 is shown for the vent 27, and a vertically slidable vent valve 29 is cooperable with said seat. This valve is provided with a downward projection 30 pivoted to a horizontal lever 31, this lever being fulcrumed to a lug 32 projecting downwardly from the cap 26. The lever 31 is pivoted to a lug 33 on a cylindrical float 34 which is located in the casing portion 24, opposite sides of said float being preferably provided with wear plates 35 to slide along internal ribs 36 of the casing during the movements of said float. The lower end of the float 34 is preferably provided with a stem 37 slidable through a suitable bracket 38 which may well be formed integrally with one side of the casing, the engagement of the stem and bracket being sufficiently loose to allow the float to tilt somewhat as the lever 31 swings vertically.

Figure 7:
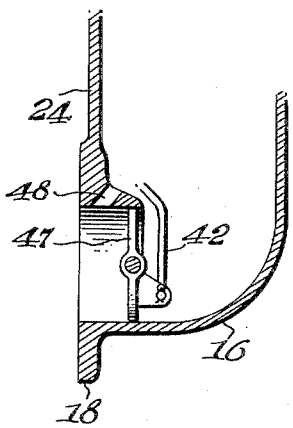
Fig. 7 is a detail sectional view similar to the lower end of Fig. 5 but showing a modification.
Figure 2:
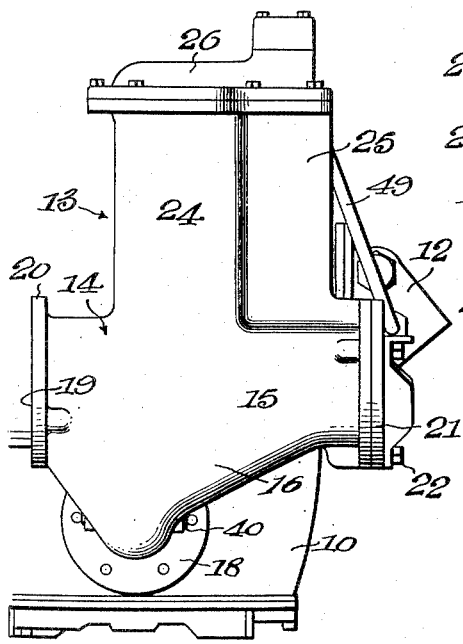
Figure 3:
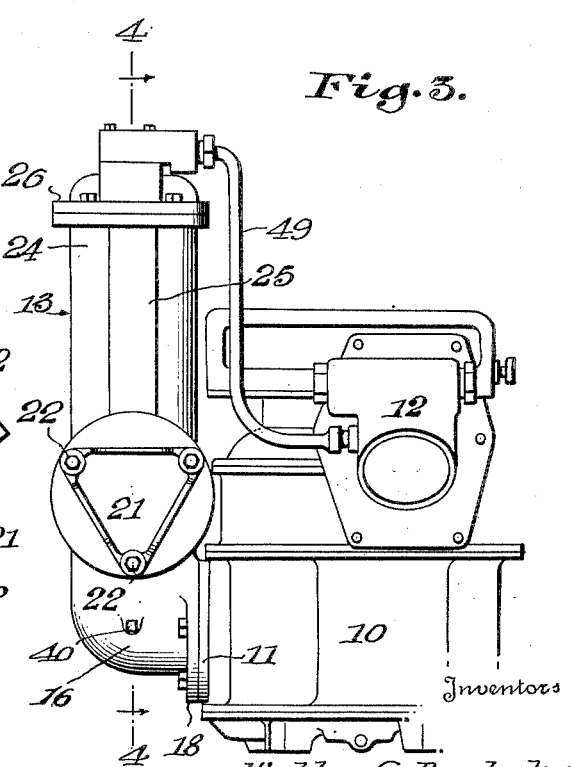

A liquid flow throttling valve 39 is pivotally mounted at 40 within the liquid outlet 17 and during normal flow stands horizontally as shown in Fig. 5. This valve is of the butterfly type and is provided with a lug 41 to which the lower end of a vertical valve actuating rod 42, is pivoted, the pivotal connection being shown at 43. The rod 42 extends vertically at one side of the strainer 23 and at its upper end is pivoted to a lug 44 projecting downwardly from the float 34, the pivotal connection being shown at 45. During periods of air elimination, the throttle valve 39 stands more or less vertically as shown in dotted lines in Fig. 5, but said valve is of insufficient size to completely close the outlet 17. On the contrary, said valve is sufficiently small to leave a space 46 between its edge and the wall of the outlet 17, which space constitutes a passage to by-pass the liquid past the valve when the latter occupies its maximum throttling position. It is essential that a by-pass passage of some sort be provided to carry the liquid past the throttle valve when the latter is in its maximum throttling position, in order that flow through the system will be merely throttled or restricted instead of entirely stopped. While it is preferable to provide this by-pass passage in the way shown, that is, by so constructing the valve 39 that it cannot completely close the outlet 17, it is of course possible to obtain the same result by employing a valve which will entirely close and by providing a by-pass passage of suitable nature to conduct liquid from the casing 14 past the closed valve. Such a variation is shown in Fig. 7 in which 47 denotes a throttle valve which will entirely close the passage 17, and 48 denotes a by-pass passage formed in the casing 14 and establishing communication between said casing and the portion of the outlet 17 beyond the valve.

To explain the operation, we will assume that the float 34 stands lowered, with the result that the vent valve 29 is fully open and the throttle valve 39 occupies its maximum flow throttling position (dotted lines in Fig. 5), and will further assume that one compartment of a tank truck is operatively coupled to the liquid inlet 19. When flow is started, the liquid can leave the casing 14 and enter the meter 10 only at relatively slow speed, for instance, 20 g. p. m. As the liquid enters the casing 14, it carries with it any air which has entered the system, and while the liquid flow is throttled by the valve 39, this air may readily separate from the liquid, rise into the upper end of the casing and discharge through the vent 27. As the air gradually discharges, the liquid level rises in the casing until it lifts float 34, thereby closing the vent valve 29 and moving the throttle 39 to wide open position. Now, throughout the major portion of the compartment emptying operation, the liquid may flow through the system at a relatively high rate of speed, for example, sixty to seventy g. p. m. When the compartment is about empty, however, and the turbulence of the liquid at the outlet of said compartment causes the entraining of air with the outgoing liquid, this air enters the casing 14 and a small quantity of said air may go on through the meter with the liquid due to the high rate of liquid discharge. However, as soon as a sufficient amount of the air collects in the upper portion of the casing 14 to cause lowering of the liquid level therein, the float 34 will lower, thereby moving the throttle valve 39 to its maximum throttling position and opening the vent valve 29. Thus, the rate of liquid flow through the device is so restricted that effective air separation can take place and all remaining air entering with the liquid may escape through the open vent 27.

In order that the air vented from the casing 14 may perform the well known syphon breaking operation to prevent complete emptying of the meter 10 by syphonic action, we prefer to provide suitable air-conducting means 40 leading from the air vent 27 to the meter faucet 12. When the compartment is almost entirely empty, the air is discharged from the casing 14 in sufficient volume to break the syphon in the discharge hose (from the nozzle 12) preventing the syphonic action from completely emptying the meter casing. Instead of using the construction shown in the drawings, the structure set forth in the W. S. Brubaker Patent No. 2,093,952, September 21, 1937, may be employed for breaking the syphon.

It will be seen from the foregoing that novel and advantageous provision has been made for carrying out the object of the invention, that is permitting discharge at a relatively high speed when this can be safely done, but diminishing the rate of flow during the relatively short periods when air in quantity must be eliminated, at the same time providing a small, light and compact structure meeting present day requirements, particularly in connection with tank trucks. Reduction of the rate of flow to approximately twenty g. p. m. is not sufficient to prevent the necessary turbulence and purging action in the pipe line and controlling apparatus between the storage tank or tanks and the separator, to promptly eliminate therefrom all pockets of air which might otherwise remain to slowly feed in driblets (insufficient at any one time to cause lowering of the float in the separator) into the liquid stream over a considerable period of time after the float in the separator has risen and opened the butter-fly valve, which driblets would otherwise flow on with the liquid stream upon acceleration of the latter to the point where the entrained air could not be separated. Said reduction of flow to twenty g. p. m., however, is sufficient to permit all air entering the eliminator to readily separate from the liquid and ascend for discharge through the vent valve.

While excellent results may be obtained from the details disclosed and they are preferably followed, it is to be understood that variations may be made within the scope of the invention as claimed. Moreover, while the invention has been explained principally in connection with a system for metering liquid, it will be obvious to those skilled in the art that it could well be used to prevent entrance of air into a portion of a liquid handling system, other than a meter. One example, is in connection with an oil distributing system in which any of a plurality of tanks may be discharged into a trunk line, and it will be obvious that the device 13 could be installed at the inlet end of said trunk line for connection with any of said tanks to prevent entrance of air and to throttle the flow when starting to empty any tank, and to act in the same way upon almost emptying any tank.

What is claimed is:

1. An air eliminator comprising a casing having a substantially cylindrical horizontal portion and a liquid inlet in one end thereof, the lower side of said horizontal cylindrical portion being depressed and having a liquid outlet, said casing being provided with a vertical substantially cylindrical portion rising from and communicating with said horizontal cylindrical portion and disposed toward one end of the latter, said vertical cylindrical portion being provided with a narrow lateral extension toward the other end of said horizontal cylindrical portion and extending vertically throughout the length of said vertical portion, said extension being in communication with said vertical portion substantially throughout its length and being in communication at its lower end with said horizontal casing portion, a horizontal cylindrical strainer in said horizontal casing portion and extending under said vertical portion and said narrow lateral extension, said strainer being in communication with said inlet, a cap for the upper end of said vertical casing portion and said extension, said cap having an air vent at the upper end of said extension, a vent valve for said vent, a float in said vertical casing portion, and means operatively connecting said float with said vent valve to close this valve when the float rises and vice versa.

2. An air eliminator comprising a casing having a substantially cylindrical horizontal portion and a liquid inlet in one end thereof, the lower side of said horizontal cylindrical portion being depressed and having a liquid outlet, said casing being provided with a vertical substantially cylindrical portion rising from and communicating with said horizontal cylindrical portion and disposed toward one end of the latter, said vertical cylindrical portion being provided with a narrow lateral extension toward the other end of said horizontal cylindrical portion and extending vertically throughout the length of said vertical portion, said extension being in communication with said vertical portion substantially throughout its length and being in communication at its lower end with said horizontal casing portion, a horizontal cylindrical strainer in said horizontal casing portion and extending under said vertical portion and said narrow lateral extension, said strainer being in communication with said inlet, a cap for the upper end of said vertical casing portion and said extension, said cap having an air vent at the upper end of said extension, a vent valve for said vent, a float in said vertical casing portion, means connecting said float with said vent valve to close this valve when said float rises and vice versa, a butterfly valve mounted in said outlet, and a rod at one side of said strainer connecting said float with said butterfly valve to open this valve when said float rises and vice versa.

3. In a liquid-metering system, an air eliminator forming part of a passage through which liquid from a supply tank flows to a meter, said air eliminator having an air-collecting chamber, a liquid inlet and a liquid outlet for said chamber, an air vent for said chamber, a float-controlled vent valve for said vent, a float-controlled throttle valve for said passage, and a by-pass for discharging a decelerated liquid stream past said throttle valve when the latter occupies its maximum closed position and thereby causing a decelerated liquid stream to enter said chamber, said by-pass being sufficiently increased in conducting capacity over the conventional pressure-balancing by-pass to conduct a meter-operating liquid stream adequately decelerated to allow effective air liberation but adequately rapid to wash air from the portion of the system between the supply tank and said chamber.

4. An improvement in a liquid metering system of the type embodying an air-eliminating chamber forming part of a passage through which liquid from a supply tank flows to a meter, a liquid inlet and a liquid outlet for said chamber, an air vent for said chamber, a float-controlled vent valve for said air vent, a float-controlled throttle valve for said passage, and a by-pas for by-passing liquid past said throttle valve when the latter occupies its maximum closed position; said improvement residing in said by-pass sufficiently increased in conducting capacity over the conventional pressure-balancing by-pass to conduct a meter-operating liquid stream adequately decelerated to allow effective air liberation but adequately rapid to wash air from the portion of the system between the supply tank and said chamber.

5. In an air eliminator having a liquid inlet for communication with a liquid supply tank, a liquid outlet for communication with a meter, an air-collecting chamber and an air vent valve for said chamber controlled by the rise and fall of liquid therein, liquid-flow-throttling means for restricting the flow of liquid from said inlet through the eliminator to said outlet, and means responsive to the liquid level in said chamber for operating said liquid-flow-throttling means, said eliminator having by-pass means of sufficient capacity to continuously pass from said inlet to said outlet a meter-operating stream of the liquid when said liquid-flow-throttling means occupies its maximum throttling position, whereby said liquid-flow-throttling means cannot at any time entirely stop a meter-operating flow through the eliminator but will sufficiently restrict the rate of flow to cause washing of air from the system into the eliminator and effective separation of this air from the flowing liquid in said air-collecting chamber for discharge through said vent valve.

6. A structure as specified in claim 5; said liquid-flow-throttling means being so constructed as to provide said by-pass means.

7. A structure as specified in claim 5; said liquid-flow-throttling means consisting of a pivotally mounted valve disk operated by a float in said air-collecting chamber and coacting with a passage in the eliminator, the area of said disk being less than the cross-sectional area of said passage.

WALTER S. BRUBAKER.
ARMAS J. SAARINEN.